United States Patent
Lin

(10) Patent No.: US 9,075,580 B2
(45) Date of Patent: Jul. 7, 2015

(54) TOOL-FREE FIXATION STRUCTURE FOR DATA STORAGE DEVICE

(71) Applicant: CREMAX TECH CO., LTD., New Taipei (TW)

(72) Inventor: Chien-Chung Lin, New Taipei (TW)

(73) Assignee: Cremax Tech Co., Ltd., New Taipei (TW)

(*) Notice: Subject to any disclaimer, the term of this patent is extended or adjusted under 35 U.S.C. 154(b) by 127 days.

(21) Appl. No.: 14/069,394

(22) Filed: Nov. 1, 2013

(65) Prior Publication Data
US 2015/0124393 A1 May 7, 2015

(51) Int. Cl.
*G06F 1/16* (2006.01)
*G06F 1/18* (2006.01)

(52) U.S. Cl.
CPC ...................... *G06F 1/187* (2013.01)

(58) Field of Classification Search
USPC ............ 248/224.8, 220.21, 682, 632, 225.21, 248/440.1, 300, 309.1, 27.1, 27.3, 583; 361/679.33, 679.36, 679.48, 679.46, 361/679.31, 679.02, 679.37, 679.34, 361/679.57, 679.47, 679.32, 679.5, 679.39, 361/679.41, 679.35, 679.29, 679.55, 361/679.08, 679.49; 347/7, 104, 16, 15, 19, 347/85, 262, 264, 244; 16/353, 346, 337, 16/340, 113.1, 438, 367, 321, 334; 206/591, 564, 583, 570, 438, 461, 206/316.1, 455, 566, 480, 514, 141; 165/80.3, 122, 121, 67, 104.33, 165/104.31, 104.14, 80.4, 104.21; 312/223.2, 326, 205, 223.1, 334.3, 312/223.5, 223.6, 333
See application file for complete search history.

(56) References Cited

U.S. PATENT DOCUMENTS

| 7,447,011 B2 * | 11/2008 | Wade et al. ............... 361/679.33 |
| 2014/0346298 A1 * | 11/2014 | Tsai .......................... 248/224.8 |

* cited by examiner

*Primary Examiner* — Hung Duong
(74) *Attorney, Agent, or Firm* — Leong C. Lei

(57) ABSTRACT

A tool-free fixation structure for a data storage device includes: a tray, a front end, center and rear end thereof being respectively formed with a position limiting portion, pressing portion, and elastic propping portion, an accepting space being formed between the position limiting portion and elastic propping portion, two propping sheets being respectively disposed on two sides of the elastic propping portion, and positioning columns being disposed on the tray at a lower side of the accepting space, an outer threaded portion being disposed on a circumference of each positioning column; a data storage device, threaded holes adapted to accept the corresponding positioning columns therein, being on a lower side thereof, an inner threaded portion being disposed in each threaded hole, thereby allowing the propping sheets to press against the data storage device, and achieving a tight engagement of the inner threaded portions with the corresponding outer threaded portions.

4 Claims, 5 Drawing Sheets

TOOL-FREE FIXATION STRUCTURE FOR DATA STORAGE DEVICE

TECHNICAL FIELD OF THE INVENTION

The present invention relates to a tool-free fixation structure for a data storage device (hard disk drive), allowing the data storage device to be fixed and replaced easily on a tray without using any tool by using an elastic propping portion presses against the data storage device to form a fixation state, after the data storage device are aligned with positioning columns through the positioning columns and the elastic propping portion formed on the tray.

DESCRIPTION OF THE PRIOR ART

Industrial computers, server hosts or general computers generally accept multiple trays stacked in a computer housing for coping with an access demand of a great quantity of electronic data, the tray mentioned above is used for mounting of a data storage device, and slid on sliding rails so as to be withdraw from or replaced in the computer housing without detaching the housing; it is rather convenient for a maintenance personnel to do check or maintenance tests or upgrade application.

Since general data storage devices are 2.5-inch, 3.5-inch hard disk drive (HDD), of solid state drive (SSD), the fixations of storage device to a tray are mostly adopted with a manner shown in FIG. 4; when a hard disk drive 9 is placed on a tray 91 cooperatively, the device mentioned above is fixed to the tray 91 by engaging a plurality of screws 93 with a plurality of corresponding threaded holes 92 disposed on the tray 91 with a tool. Although this kind of manner is easy to be implemented, a tool must be used continuously to carry out a repeated action of detachment and reassembly upon substantial replacement and upgrade; it is rather time and labor consuming.

SUMMARY OF THE INVENTION

To solve the problems of a conventional fixation structure for a data storage device, the present invention proposes a tool-free fixation structure for a data storage device, having an accepting space formed between position limiting portion and elastic propping portion on a tray, where the tray further includes at least two propping sheets and a connection portion. A plurality of positioning columns disposed with an outer threaded portion on a circumference of each thereof are formed on a lower side of the accepting space. Furthermore, a plurality of threaded holes with an inner threaded portion therein (the plurality of threaded holes are designed into ones with standard specifications conforming to storage devices of all brands) are disposed originally on a lower side of a data storage device, where the threaded hole is larger than the corresponding positioning column in diameter. When the data storage device is to be fixed to the tray, the data storage device is first mounted in the accepting space, allowing the plurality of positioning columns to be positioned in the plurality of corresponding threaded hole. In the meantime, the data storage device is moved forward due to an acting force of the elastic propping portions disposed behind the rear end thereof exerting thereon, causing the tight engagement of the positioning columns with the corresponding threaded holes. Whereby, the data storage device can be fixed to the tray without using any tool.

Therefore, the main object of the present invention is to provide a tool-free fixation structure for a data storage device, having a tray with a plurality of poisoning columns, a data storage device (2.5-inch, 3.5-inch hard disk drive) being fixed to the tray through these positioning columns without using any tool.

Another object of the present invention is to provide a tool-free fixation structure for a data storage device, allowing a data storage device to be detached and replaced quickly through cooperation of the rear end with an elastic propping portion disposed on a rear end of a tray, attaining substantially increased convenience and time, labor consumption.

DETAILED DESCRIPTION OF THE PREFERRED EMBODIMENTS

Figure 1:
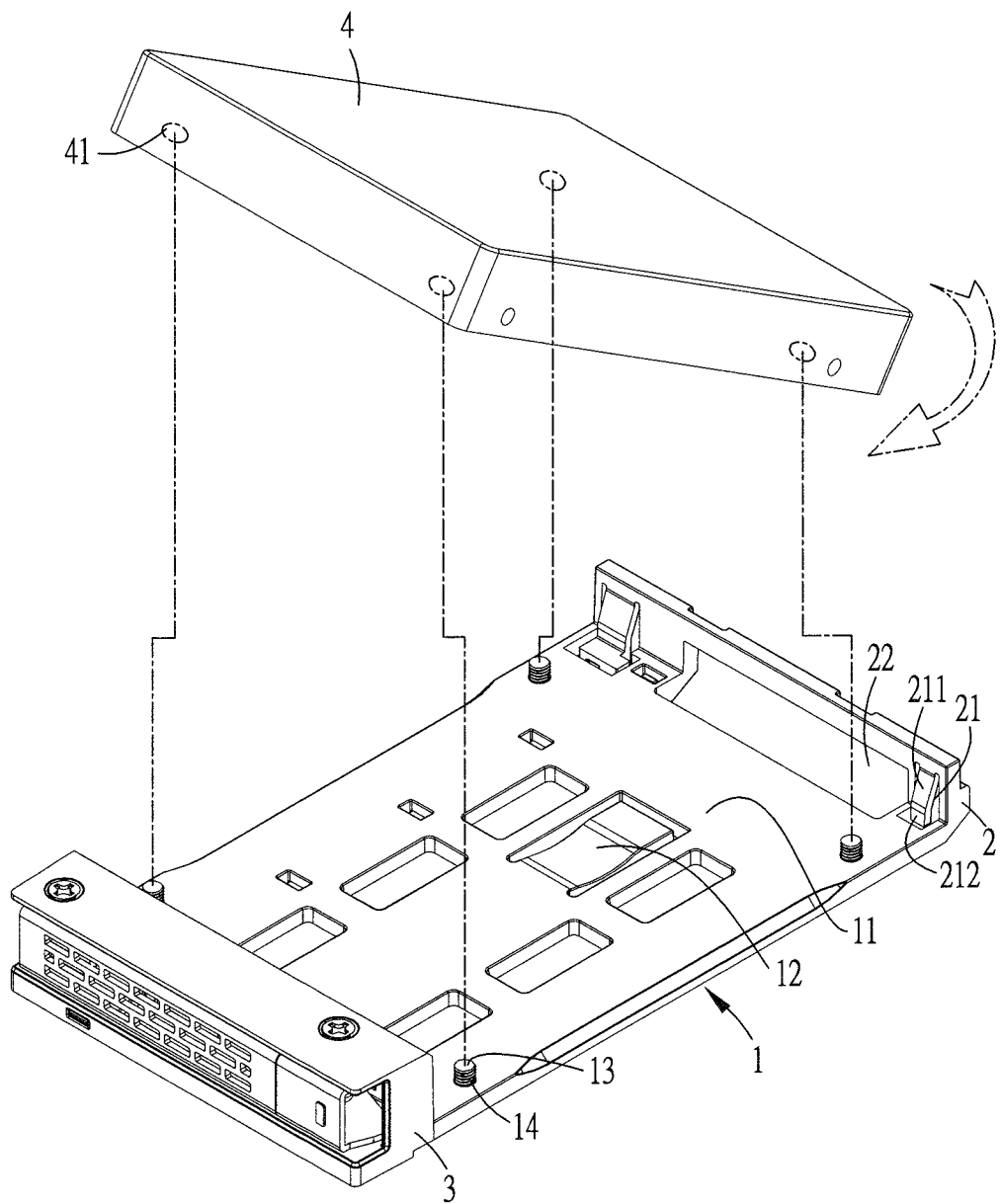
FIG. 1 is a schematically perspective view of the present invention.
Figure 2:
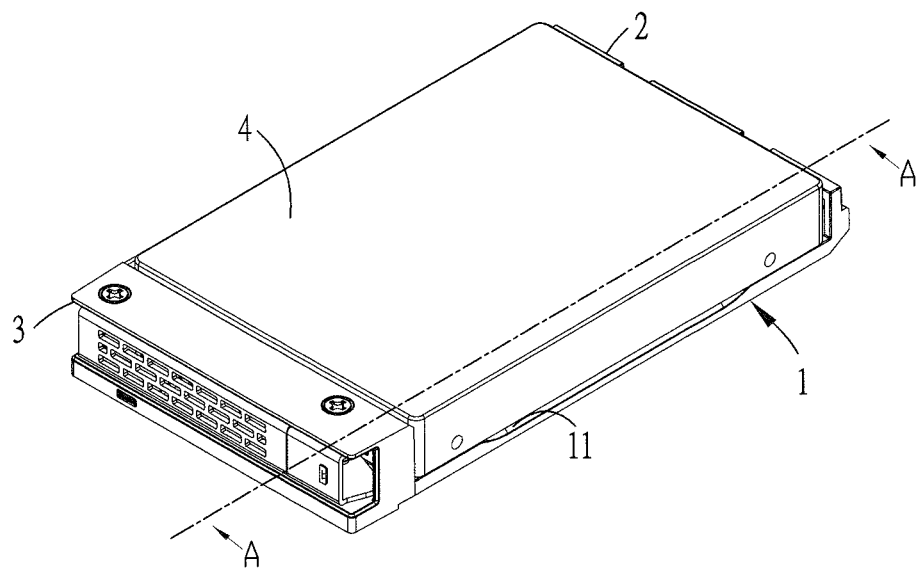
FIG. 2 is a schematic view of the assembly of a data storage device on a tray according to the present invention.

Referring to FIGS. 1 to 3C, the present invention is a tool-free fixation structure for a data storage device, in which a tray 1 is formed by means of integral injection molding, where the front end of the tray 1 is formed into a position limiting portion 3 and he rear end thereof an elastic propping portion 2; the position limiting portion 3 is mainly adapted to fasten the tray 1 and a housing or a compatible device. Furthermore, a pressing portion 12 is configured on the center of the tray 1, and an accepting space 11 between the position limiting portion 3 and the elastic propping portion 2. In addition, a plurality of positioning columns 13, which are formed by means of injection molding with metal and plastics integration or by means of metal cooperating with insert molding, are disposed on the tray 1 at the lower side of the accepting space 11, an outer threaded portion 14 being disposed around each positioning column 13; a plurality of threaded hole 92, inside each of which an inner threaded portion 42 is disposed, are disposed on the lower side of a data storage device 4, where the threaded hole 92 is larger than the positioning column 13 in diameter. Thereupon, the inner threaded portion 42 and the outer threaded portion 14 can be fit and positioned tightly through the elastic propping portion 2.

Figure 3:
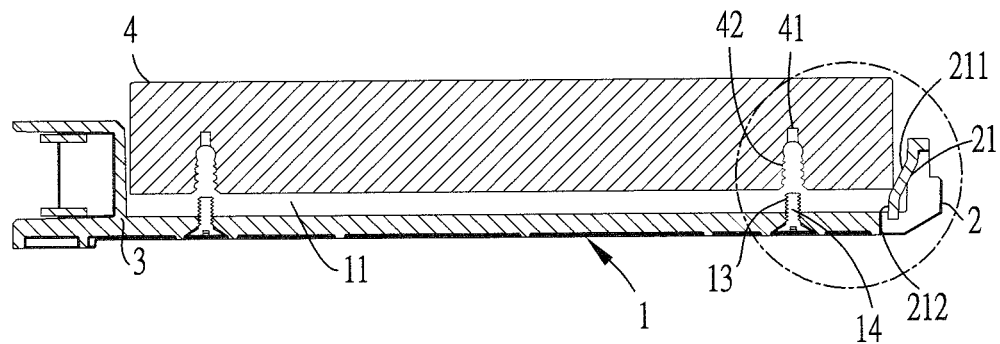
FIG. 3 is a cross-sectional view taken along line A-A' of FIG. 2.
Figure 3A:
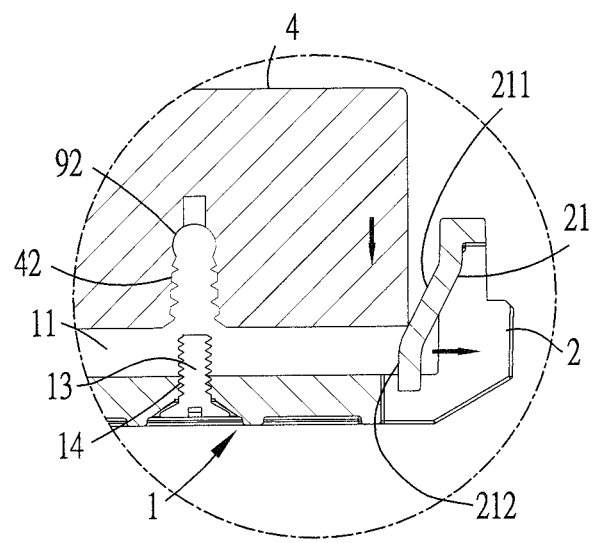
FIGS. 3A to 3C are partly enlarged cross sectional views of FIG. 3, showing continuous actions of the assembly of a data storage device on a tray.
Figure 3B:
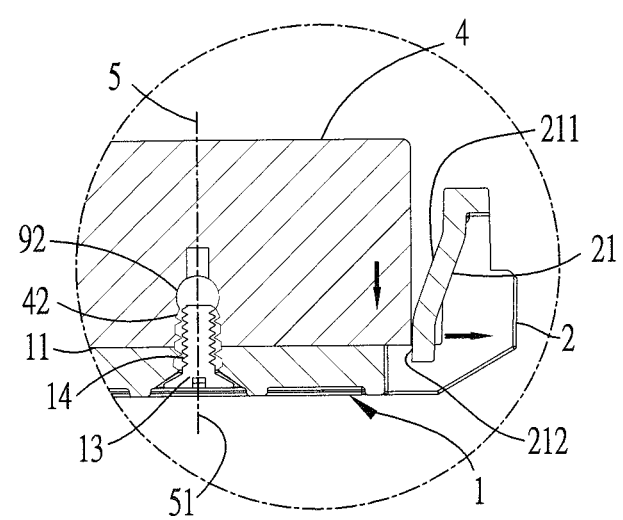
Figure 3C:
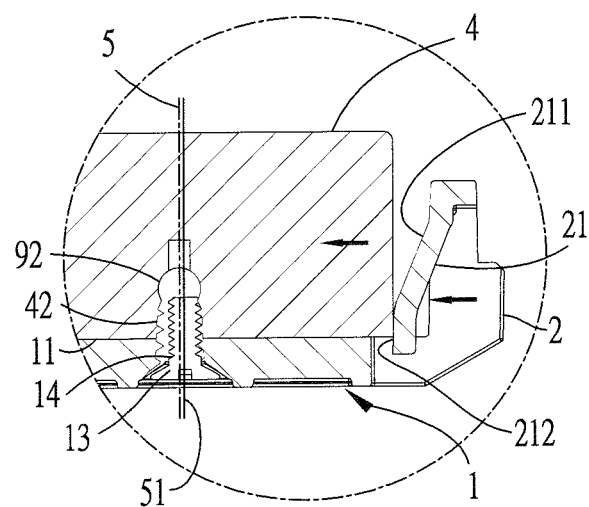
Figure 4:
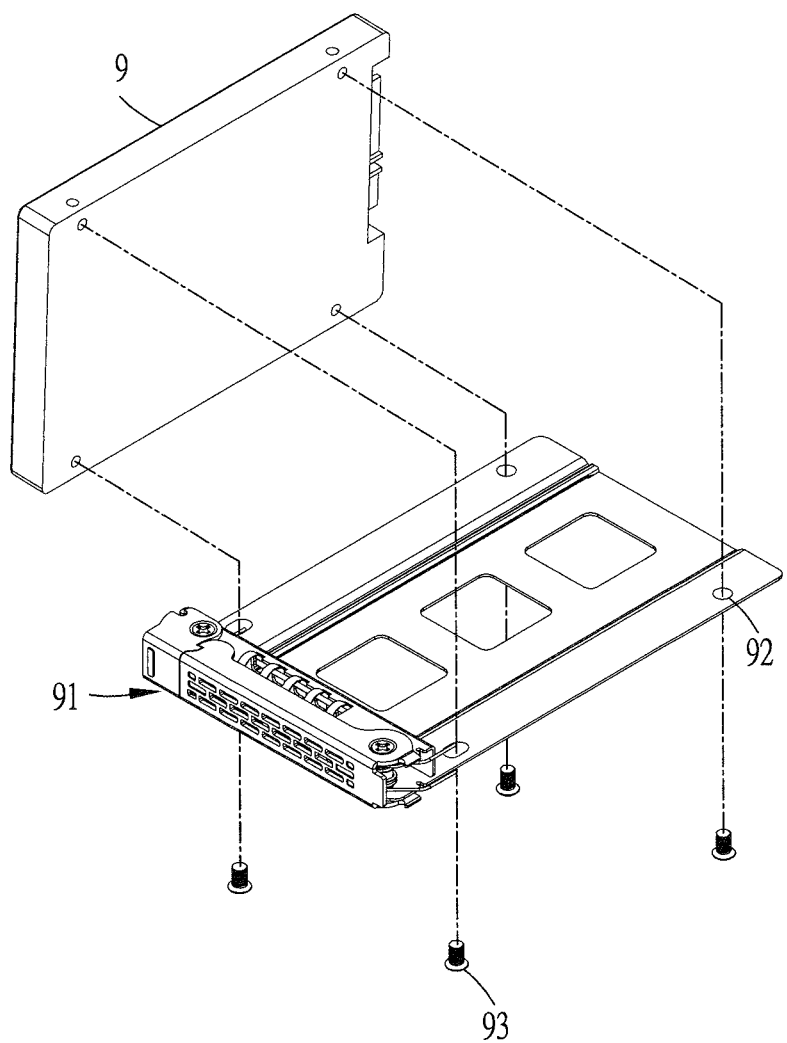
FIG. 4 is a schematic view of a prior art.

Referring to FIGS. 1 to 3C again, the elastic propping portion 2 is further disposed with at least two propping sheets 21, each of which further includes an inclined segment 211 and a propping segment 212, where the inclined segment 211 is formed by inclining forward one segment of the propping sheet 21 originating from the elastic propping portion 2, and another segment of the propping sheet 21 connected with the inclined face 211 is formed into the propping face 21, thereby, a user may inclines the rear end of the data storage device 4 slightly and then exerts a force with their hand to press it downward against the inclined face 211 when the data storage device 4 is being mounted on the tray 1; it is labor saving and easier upon the mounting. The two propping sheets 21 are pressed backward by the data storage device 4, as FIGS. 3 and 3A show, allowing the plurality of threaded holes 41 disposed on the data storage device 4 to be positioned approximately above the plurality of corresponding positioning columns 11. Referring to FIG. 3B, the force is exerted continuously to press the data storage device 4 downward to place in the accepting space 11, meanwhile, a central axes 5 of the threaded holes 92 coincide with central axes 51 of the corresponding positioning columns 13 when the data storage device 4 is pressed to touch the bottom face of the tray 1. Furthermore, referring to FIG. 3C, the propping sheets 21 in contact with the rear end of the data storage device 4 will press the data storage device forward after the downward force disappear, causing the central axes 5 to move forward to depart from the corresponding axes 51 to engage the inner threaded portions 42 disposed on the threaded holes 92 with the corresponding outer threaded portions 14 of the positioning columns 13 tightly, allowing the data storage device 4 to be fixed in the accepting space 11 of the tray 1 firmly. Furthermore, only a force is needed to exert on the pressing portion 12 of the tray 1 so as to prop against the lower side of the data storage device 4 when a withdrawal of the data storage device 4 is carried out, enabling the data storage device 4 to be inclined upward from the propping sheets 21, thereby withdrawing the data storage device 4 from the accepting space 11 lightly and increasing the replacement convenience thereof.

To sum up, the present invention allows a user only to exert a force by hand to fix a data storage device in a tray without using any tool or accessories, thereby fixing a data storage device in a tool-free way and replacing it lightly.

I claim:

1. A tool-free fixation structure for a data storage device, comprising:

a tray, a front end thereof being formed with a position limiting portion, and a rear end thereof an elastic propping portion, an accepting space being formed between said position limiting portion and said elastic propping portion, at least two propping sheets being respectively disposed on two sides of said elastic propping portion, and a plurality of positioning columns being disposed on said tray at a lower side of said accepting space, an outer threaded portion being disposed on a circumference of each of said plurality of positioning columns; and a data storage device, a plurality of threaded holes adapted to accept said plurality of corresponding positioning columns therein, being disposed on a lower side thereof, an inner threaded portion being disposed in each of said plurality of threaded holes, thereby pressing said propping sheets against said data storage device, and achieving a tight engagement of said inner threaded portions with said corresponding outer threaded portions.

2. The structure according to claim 1, wherein said positioning column is smaller than said threaded hole of said data storage device in diameter.

3. The structure according to claim 2, wherein said propping sheet further comprises an inclined segment and a propping segment, said inclined segment is formed by inclining forward one segment of said propping sheet originating from said elastic propping portion, and another segment of said propping sheet connected with said inclined face is formed into said propping face, said propping segment cooperates with a rear side of said data storage device, said inclined segment is allowed to yield a reacting force to press said data storage device through cooperation between said inclined segment and said data storage device when said data storage device is pressed down to place in said accepting space.

4. The structure according to claim 3, wherein said tray further comprises a pressing portion disposed on a bottom thereof, allowing said data storage device to be inclined upward from said elastic propping portion to withdraw from said accepting space when a force is exerted on said pressing portion to press against a lower side of said data storage device.

* * * * *